US006912529B1

(12) United States Patent
Kolfman

(10) Patent No.: US 6,912,529 B1
(45) Date of Patent: *Jun. 28, 2005

(54) METHOD AND SYSTEM FOR STORING AND RETRIEVING DOCUMENTS

(75) Inventor: Michael Kolfman, Brooklyn, NY (US)

(73) Assignee: Multex Systems, Inc., New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 86 days.

(21) Appl. No.: 09/053,515

(22) Filed: Apr. 1, 1998

(51) Int. Cl.[7] .............................................. G06F 17/30
(52) U.S. Cl. ..................... 707/10; 707/5; 707/104.1
(58) Field of Search ............................ 707/3–5, 9–10, 707/100–104.1, 200–206; 709/206; 715/513

(56) References Cited

U.S. PATENT DOCUMENTS

| | | | | |
|---|---|---|---|---|
| 5,745,908 A | * | 4/1998 | Anderson et al. | 707/513 |
| 5,793,966 A | * | 8/1998 | Amstien et al. | 709/203 |
| 5,802,518 A | * | 9/1998 | Karaev et al. | 707/9 |
| 5,819,271 A | | 10/1998 | Mahoney et al. | 707/9 |
| 5,864,871 A | | 1/1999 | Kitain et al. | 707/104.1 |
| 5,870,549 A | * | 2/1999 | Bobo, II | 709/206 |
| 5,884,309 A | * | 3/1999 | Vanechanos, Jr. | 707/10 |
| 5,907,705 A | | 5/1999 | Carter | 717/122 |
| 5,907,837 A | * | 5/1999 | Ferrel et al. | 707/3 |
| 5,937,160 A | * | 8/1999 | Davis et al. | 707/10 |
| 5,940,843 A | | 8/1999 | Zucknovich et al. | 707/516 |
| 6,038,668 A | | 3/2000 | Chipman et al. | 713/201 |
| 6,233,592 B1 | | 5/2001 | Schnelle et al. | 715/513 |
| 6,350,066 B1 | * | 2/2002 | Bobo, II | 709/206 |
| 2002/0091923 A1 | | 7/2002 | Chipman et al. | |

FOREIGN PATENT DOCUMENTS

| | | |
|---|---|---|
| EP | 0 840 212 | 5/1998 |
| WO | WO 98/3479 | * 8/1998 |
| WO | WO 98/34179 | 8/1998 |
| WO | WO 99/13417 | 3/1999 |

OTHER PUBLICATIONS

"XML Gains Momentum" PC Week, Mar. 30, 1998, v. 15, No. 13 ISSN: 0740–1604, p. 20.
"Elementary XML" Robert Carter, Microsoft Site Builder, Aug. 14, 1997, 4 pages.
"Yahoo to Extend Web Searching with DEC Technology" Newsbytes, Jun. 6, 1996, pNEW06060031.
"DEC Exploits Alta Vista Name in New Web Line", Computergram Int'l, May 8, 1996, No. 908, pCGN05080007, ISSN 0268–716X.

(Continued)

*Primary Examiner*—Shahid Alam
*Assistant Examiner*—Jean Bolte Fleurantin
(74) *Attorney, Agent, or Firm*—Kenyon & Kenyon

(57) ABSTRACT

A system for storing and retrieving text-based documents stores each of the documents in accordance with a mark-up language that comprises mark-up elements defined by a meta-language such as XML (Extensible Mark-up Language). In particular, each text document includes a plurality of text items, and each text item is associated in the text document with at least one of the mark-up elements. Each text document is stored at a central repository that is in communication with a plurality of user computers. A user can retrieve those documents that are of interest by formulating a search query that is transmitted from a user computer to the central repository. A search engine searches through the text items of each stored text document in order to determine which text documents satisfy the search query. Those text documents that satisfy the search condition are retrieved from the central repository and provided to the user computer for display.

11 Claims, 2 Drawing Sheets

OTHER PUBLICATIONS

*The DataChannel XML Generator*, DataChannel XML Development Environment, Mar. 3, 1998.

Tim Bray, *SGML: Announcing Lark, an XML Processor*, Jan. 5, 1997.

*Microsoft XML Parser in Java*, Version 1.8, Jan. 16, 1998.

Adler et al., *A Proposal For Extensible Style Language (XSL)*, Sep. 11, 1997.

Tim Bray, *An Introduction to XML Processing With Lark and Larval*, Jan. 5, 1998.

Bray et al., *Extensible Markup Language (XML)*, Dec. 8, 1997.

*The Microsoft XSL Processor*, Technology Preview Release, Jan. 7, 1998.

Henry S. Thompson, *An Introduction to XSL: Lesson # 1: What is XSL?*, Univ. of Edinburgh, SGML UK, Oct. 27, 1997.

*Parsers and Engines*, SGML & XML Tools, Mar. 3, 1998.

*LT XML, Version 0.9.5*, Language Technology Group, Aug. 21, 1997.

*Microsoft ArborText, DataChannel and Inso Submit XML-Data Specification to W3C*, DataChannel Press Release, Jan. 27, 1998.

Paul Grosso, *Concepts in XML Editing*, DataChannel Press Release, Aug. 13, 1997.

*XML Parsing Package*, Tel Support for XML, Jun. 19, 1997.

Guha et al., *Meta Content Framework Using XML*, Mar. 3, 1998.

David Megginson, *Aelfred XML Parser*, Microstar Software Ltd., Mar. 3, 1998.

XSL Tutorial —*Lesson #1: What is XSL*, Mar. 3, 1998.

*W3C Issues, ML 1.0 as a Proposed Recommendation*, World Wide Web Consortium, Dec. 8, 1997.

Janus Boye, *XSL—What's in it for us?*, Mar. 28, 1998.

\* cited by examiner

METHOD AND SYSTEM FOR STORING AND RETRIEVING DOCUMENTS

FIELD OF THE INVENTION

The present invention is directed to a method and system for storing and retrieving documents, and in particular, to a method and system for storing and retrieving each document as a respective informational entity without any ensuing loss of information from the document.

COPYRIGHT NOTICE

A portion of the disclosure of this patent document contains material which is subject to copyright protection. The copyright owner has no objection to the facsimile reproduction by anyone of the patent document or patent disclosure as it appears in the Patent and Trademark Office patent file or records, but otherwise reserves all copyright rights whatsoever.

BACKGROUND INFORMATION

Over the past decade, the worldwide proliferation of computers and networks has made success in commerce and investing depend even more on rapid access to information that is both accurate and specifically tailored to achieving a particular financial goal. Nowhere has the dependence on speedy access to vast repositories of data been more pronounced than in the global equity markets. Investors around the world require accurate, timely information in order to determine which investment possibilities present the best chance for maximizing their returns. Companies such as brokerage firms, which traditionally disseminated such information in the form of printed reports, have supplemented these printed reports by establishing proprietary networks that electronically collect at a central repository documents that provide financial information about stocks, bonds, mutual funds, and other investment vehicles. Subscribers can download such documents by connecting to the central repository through a network, such as the Internet, for example.

In a previously proposed document storage and retrieval system, a central repository receives financial documents for electronic storage from a plurality of contributor workstations. This repository comprises a database and associated server. The plurality of contributor workstations is networked with the central repository, either through a server or the Internet. At each contributor workstation, a contributor prepares a document by using any suitable word processor application, text editor, or proprietary tool. This document may include financial information about a particular stock. After preparing the document, the contributor converts the document to a portable digital file (PDF) using, for example, the PostScript software package. Because of this conversion, the document no longer is an informational entity, but is instead a visual representation of this information. This is because the PDF is formatted according to codes that do not actually contain information that can be searched; instead, these codes of the PDF are intended to visually represent the document information, and they can be translated into viewable form on a display only by PDF viewer software such as ADOBE ACROBAT. Thus, a consequence of this conversion is that the actual contents of the PDF will not be known until they are actually displayed by the display of a subscriber computer. In order to compensate for such a loss of information, the contributor also prepares a separate record that summarizes the contents of the associated PDF. However, such records will contain only information that describes in a general manner the information represented in the associated PDF file; specific financial data represented in the associated PDF will not be present in this record. Moreover, the information represented in these PDFs can be of various types; the records that are associated with these PDFs are simply not flexible enough to accommodate all these various kinds of information.

Once the contributor has prepared a record, the contributor submits the PDF and associated record to the central repository. Subscribers access the central repository through their respective personal computers, which can access the central repository through a web server that is coupled to the central repository through the Internet. Subscribers who wish to obtain documents that include certain desired information formulate and transmit to the central repository search queries directed to such desired information. As explained above, the search performed at the repository cannot sift through the actual PDFs because they are not informational entities; instead, the search must analyze the information in the records associated with these PDFs. Since the information in these records is of a very general nature, search inquiries that are narrowly tailored to finding specific financial information are useless. For example, a user is interested in retrieving from the central repository documents that provide information about stocks with a P/E ratio of 30 or less. A person using this previously proposed system cannot focus his search on the basis of such narrow criteria because the records associated with the PDFs do not contain such specific information. Therefore, the user will have to formulate a search query that is based on much more general criteria; as a result, the PDFs that are downloaded to the user's computer for viewing most likely will relate to stocks that the user has no interest in. Thus, the previously proposed system is useful only for performing searches based on broadly defined criteria. Indeed, if the user wishes to obtain from such a system only those documents with very specific desired information, the user will have to open and inspect each and every document on the system. Therefore, the previously proposed system cannot reasonably accommodate users with very specific and particularized search needs.

Moreover, since the files in this system are downloaded as PDFs, the user cannot customize the manner in which the document is viewed. For example, the user cannot instruct his computer to display the P/E information of these received PDFs in the form of tables or any other desired viewing format.

What is therefore needed is a system that stores documents without producing the information loss described above and that permits searches to be performed on the actual information of such documents in order to allow subscribers to access only those documents that satisfy narrowly crafted search criteria.

SUMMARY OF THE INVENTION

In order to overcome the above-described information loss that affected previous document retrieval systems, the present invention is directed to a system for storing and retrieving documents that each contain a plurality of text items arranged in accordance with a mark-up language, such as a document type definition created in accordance with XML (Extensible Mark-up Language). This system includes a document storage device for storing each document and at least one contributor workstation in communication with the document storage device. Each contributor workstation includes a document generating module for formatting the at least one document in accordance with the mark-up language prior to storage at the document storage device. The system of the present invention further includes a search engine, in communication with the document storage device, for retrieving documents on the basis of a search of the plurality of text items of each stored document. Also in communication with the document storage device is at least one user computer that includes a processing module for processing retrieved documents in accordance with the mark-up language.

According to another embodiment, the present invention is directed to a method of creating a text document comprising a plurality of financial text items in accordance with a pre-defined mark-up language. The present invention according to this embodiment defines, in accordance with a meta-language, the pre-defined mark-up language as including at least a plurality of mark-up elements; each mark-up element pertains to one of a plurality of types of financial categories. The present invention also defines, in accordance with the meta-language, an attribute list for at least one of the mark-up elements; each attribute list includes at least one attribute declaration defining a type of financial information. The present invention then marks-up each financial text item by associating each financial text item with at least one of the attribute declarations or mark-up elements.

According to another embodiment of the present invention, which is directed to a system for storing and retrieving text documents containing a plurality of text items arranged in accordance with at least one mark-up element of a mark-up language, the present invention according to this embodiment searches through the text items of each document by first accepting a search query comprising at least one sub-query; each sub-query includes at least one search condition. The present invention then determines whether each sub-query is either unrestricted or restricted by determining whether each sub-query includes a search field; each search field identifies one of particular mark-up element of the mark-up language. If the sub-query is restricted, the present invention determines whether the search condition of the restricted sub-query is satisfied by the text item associated with the mark-up element that is identified by the search field of the restricted sub-query. If the sub-query is unrestricted, the present invention determines whether the search condition is satisfied by any text item of the text document. The present invention then retrieving each text document satisfying the search condition of the at least one of the sub-queries of the search query.

DETAILED DESCRIPTION

Figure 1:
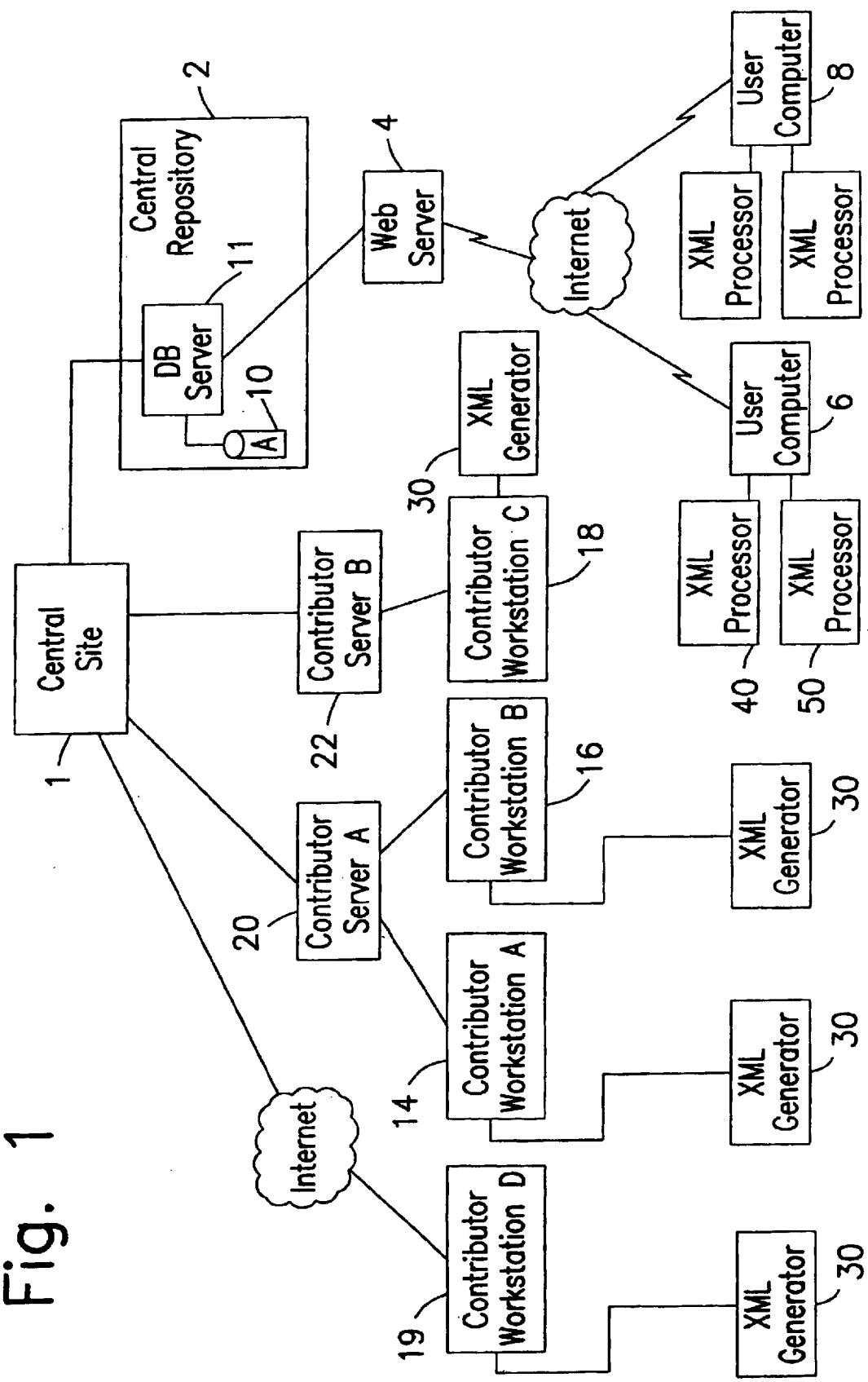
FIG. 1 illustrates a system for storing and retrieving text documents according to the present invention.

FIG. 1 illustrates a document storage and retrieval system that stores documents prepared at contributor workstations 14, 16, 18, and 19 in central repository 2. Users can retrieve certain of these stored documents by transmitting from user computers 6, 8 search queries that include search criteria. Documents that satisfy these criteria are sent electronically to the requesting user computers 6, 8. Before describing in further detail the system architecture of FIG. 1, the present discussion shall focus on the manner in which the documents are structured.

The previously proposed system discussed above provides only limited search capabilities because the actual information in the stored documents is represented according to a format that renders the document information unsearchable. Instead, the searches in such a system proceed on the basis of rigidly structured records that are associated with these documents. These records provide a generalized summary of what their associated documents contain, but they do not have the flexibility to describe with any sufficient detail what kinds of data are included in the associated documents. Thus, if a user is interested in obtaining documents that include information type A, it is quite possible that a search using the previously proposed system will not retrieve any such documents, even though such documents are in fact stored in the system. The reason why such an omission would occur is that the associated records of these documents do not have the ability to indicate that certain documents include this desired information, and hence, a search of such records would not uncover the desired documents.

In order to overcome this disadvantage, in accordance with the exemplary embodiment of the present invention, "meta-information" is embedded in a contributor document. "Meta-information" is information that defines other information. Such meta-information may be used to describe the kind of information in the document. A search engine may then use this meta-information to identify those documents that satisfy a particular search criteria. One way that meta-information may be incorporated into text-based documents is through markup languages. An example of a markup language is HTML (Hyper Text Markup Language). HTML is referred to as an application of the Standard Generalized Markup Language (SGML), which is a language that can be used to define other languages. Generally speaking, HTML is used to structure the text information found in Web pages. An HTML document is defined as a text file that contains not only text (such as stock report information), but also embedded instructions, called elements, that instruct a Web browser, or any other compatible viewing software, on how the text in the document should be structured and presented to a user. Tags are used to define an element; an element comprises a "start" tag, which has a name that describes the contents of the element, and an "end" tag, which closes the element. An example of an HTML element is the paragraph element. The start tag for this element is represented by the letter P enclosed within angled brackets (<P>). The end tag is represented the same way, except that a slash (/) character is inserted before the element name (</P>). In between the start and end tag is text. Thus, a portion of an HTML document may appear as:

<P>
This is where the text appears.
</P>

A person who understands HTML and who looks at this code will understand that the enclosed text is intended to be a paragraph. The significance of text can thus be obtained from the descriptive name of the associated element. A Web browser that receives an HTML document with this kind of code will present the enclosed text to the user in the form of a paragraph. The elements themselves, however, will not be displayed because they are instructions, not display text. Other HTML elements include the TITLE element, which is associated with text corresponding to the title of the document, and the HEAD element, which encloses supplementary information about the document.

Although HTML is applicable to a broad set of uses, it is not very useful with applications that rely on specialized information, such as financial information relating to stocks, bonds, and other investment vehicles. That is because the type of elements used for HTML is fixed and cannot be changed to more accurately and specifically describe associated text. For example, if a particular piece of text includes numerical data relating to the price history of the stock of a particular company, HTML does not provide any markup element that would accurately and specifically indicate that the associated text is directed to the price history of the stock.

Since SGML is a meta-language, meaning that it can be used to define other languages, one may use SGML to define markup elements that are specifically tailored for marking up such specialized information. Although SGML can be used to define highly specialized document types, SGML is a complicated language to use and cannot be efficiently implemented over the Web. XML (Extensible Markup Language) is basically a simplified dialect of SGML that was designed with the Web specifically in mind. XML was established by the World Wide Web Consortium (W3C), which is an international coalition of hardware software, and content providers that banded together in order to develop common protocols that ensure the interoperability and promote the evolution of the Web. What XML achieves is a compromise between the complexity of SGML and the inflexibility of HTML.

Since XML is merely a simplified version of SGML, it too is a meta-language that can be used to define other languages. In particular, XML can be used to design elements and other markup characters that describe specialized information better than HTML. By using XML, a document that includes text relating to the price history of a company stock can use an element with the name PRICE-HIST, which would be defined as an XML element specifically for this application. When this element is used to enclose text in a document, one looking at the document will be able to discern that the text enclosed by the start and end tags of the PRICE-HIST element is directed to information concerning the price history of that company's stock. Thus, XML allows authors to use customized markup elements to semantically describe the content or meaning of the associated text.

The end of the present specification includes computer code for an exemplary XML document and associated Document Type Declaration (DTD) that are directed specifically to marking up text information about the financial characteristics of a company in accordance with an exemplary embodiment of the present invention. A DTD is a document that contains rules to which the structure and content of the XML document must conform. For purposes of this discussion, when an element, or any other mark-up code, is said to "appear" at a particular location in the XML document, that means that the element's associated tags appear at that particular location in the XML document itself; it does not mean that the tags associated with that element actually appear on a user display screen when the XML document is rendered for display. As stated before, elements in markup languages are not intended for display; elements in markup languages are instructions that are embedded in a text file that is transmitted over a network or internet to a recipient computer, and these elements guide the recipient computer on how the text associated with the elements are to be structured when presented to a user. In XML, most elements comprise a pair of angle-bracketed tags that surround some text. As with HTML, the first tag in an XML-defined element is referred to as a start tag. Following this start tag is some text that is to be affected by the pair of tags; at the end of the text is an end tag which encloses the particular text to be affected by the element that is represented by the tags. Other elements, referred to as empty elements, do not have end tags; they merely comprise start tags and do not enclose any associated text. The following is a discussion of the code that appears in the XML document and the DTD.

<?XML VERSION="1.0" ENCODING="UTF-8"?>

The first line of the XML document is an XML declaration that specifies the version of XML being used. The question marks in this first line signify that the line is to be treated as a processing instruction by the XML processor, which shall be described in more detail later on. The ENCODING portion of this line refers to the particular character set according to which the XML document is coded. XML favors Unicode, as opposed to HTML, which favors ASCII.

<!DOCTYPE FINCORP.MORNING SYSTEM "Note.dtd">

This next line of the XML document consists of the Document Type Declaration, which can either refer to an external file or comprise a series of codes that are internal to the XML document, or both. In this example, the DTD is an external file referred to by the document name and file extension "Note.dtd". Also included in the DTD line is the name of the XML document, which in this example is FINCORP.MORNING. As explained above, the advantage of XML is that it affords users greater flexibility than HTML to format complex structured documents that contain specialized information. XML provides this flexibility by allowing new elements to be defined and customized in accordance with the structuring and descriptive needs of documents that include such specialized information. The DTD is where these new elements are created by the author. As will be seen in the discussion below, the particular elements that are defined and used in the exemplary XML document and associated DTD of the present invention are tailored for a stock research application, in which financial information relating to various companies can be structured in the XML document in accordance with the newly defined elements set forth in the associated DTD. These customized elements provide a descriptive mark-up of the text data included in the XML document. In particular, these customized elements describe their associated text much more specifically than regular HTML elements ever could. As stated above, what gives XML such powerful capabilities to describe the text it marks up is that XML allows users to create elements with names that reveal the meaning or significance of the associated text. For example, if a user creates an element with the name of PRICE-TO-BOOK, someone looking at an XML document that uses this element will realize that the text that is marked up by this element is a price-to-book ratio for a particular company. Although XML documents are not required to use DTDs, those that do can validate, or check, that all of the elements that should be in the XML document are actually present and that these elements conform to the rules set forth in the DTD. For those elements that are not defined in the DTD, they are considered to be of the ANY type.

Document Type Declaration

In order to understand the structure provided by the XML document included in the present specification, reference shall now be made to the DTD of the present invention referred to as "Note.dtd", which is provided after the XML document in the present specification. The DTD of the exemplary embodiment of the present invention is what provides the necessary structuring rules for allowing the exemplary XML document to mark-up the text information to be included therein.

```
<!ELEMENT USC-STOCK-NOTE (STOCKS,
SUMMARY, DETAILS?)>.
```

This first line of the DTD is an example of what is referred to as an element declaration, which defines a new element to be used in the XML document by constraining an element's type and its content. What this particular element declaration does is create an element that is called USC-STOCK-NOTE. The terms inside the parentheses are more elements, which are defined later on in the DTD. Generally speaking, the information placed within the parentheses of an element declaration is referred to as a content model. The content model may include, as this particular example does, only elements, or it may include certain character data with elements. In this example, the commas that separate each element name within the parentheses means that in the associated XML document each element in the parentheses is to be followed by the next one in this set. Of course, if each element in the content model is in turn associated in its own element declaration with a content model that itself comprise further elements, then these further elements must appear in the XML document in the order set forth in their particular content model before the other elements in the first element content model. To illustrate how these elements are to be properly nested in the XML document, assume that element A is defined in the DTD by a content model comprising elements B and C. Further assume that element B, in turn, is defined by a content model comprising elements 1, 2, and 3, and that element C is defined by a content model comprising elements 4, 5, and 6. In the XML document, once element A appears, it will be followed by element B. But before element C can validly appear in the XML document, elements 1, 2, and 3, along with whatever constituent elements have been defined in their particular content models, must first appear nested within element B. Only then can element C, along with elements 4, 5, and 6 nested within element C. appear in the XML document. These elements would appear in an XML document as follows:

```
<A>
   <B>
      <1>
      •
      •
      •
      </1>
      <2>
      •
      •
      •
      </2>
      <3>
      •
      •
      •
      </3>
   </B>
   <C>
      <4>
      •
      •
      •
      </4>
      <5>
      •
      •
      •
```

```
      </5>
      <6>
      </6>
   </C>
</A>
```

As this indication illustrates, an element is first inserted into an XML document by typing in its start tag. If the element is a non-empty element, it will be followed by either text data or more elements nested within, as seen above. Once all of the text and/or elements that should be nested within the element have been inserted in the XML document, that element is closed with an end tag, which is represented in the XML document by the element name preceded by a slash "/" and surrounded by angled brackets. If the element is an empty element, it would not enclose any other text or elements and would appear in the XML document only as a start tag.

If each term within the parentheses is separated not by a comma, but by a |, then each term is to be used as alternatives in the associated XML document. Thus, A|B means A or B, not A followed by B. In this example, when the element USC-STOCK-NOTE is used in the XML document, the element STOCKS should then appear and it should be followed by the element SUMMARY. As for the element DETAILS, the use of a question mark (?) immediately after it signifies that when an XML document includes the element USC-STOCK-NOTE, the element DETAILS should either appear only once or it will not appear at all. Thus, when an XML document uses the element USC-STOCK-NOTE, it must be followed either by STOCKS, SUMMARY, and DETAILS, or by STOCKS and SUMMARY.

`<!ELEMENT STOCKS (DESCRIBED, MENTIONED?)>.`

The next line of the DTD creates the element STOCKS and declares its constituent elements DESCRIBED and MENTIONED. When the element STOCKS is used in an XML document, it must be followed in order by either the element DESCRIBED only, or by the element DESCRIBED followed by the element MENTIONED.

`<!ELEMENT DESCRIBED (PERIOD-NAMES, STOCK, STOCK?, STOCK?, STOCK?>`

As indicated by this element declaration, when the element DESCRIBED appears in the XML document, it is to be followed, in turn, by the element PERIOD-NAMES and at least one recitation of the STOCK element.

`<!ELEMENT MENTIONED (STOCKREF+)>`

According to this element declaration, the element MENTIONED is followed by the element STOCKREF; the +symbol appearing after the STOCKREF element name means that it may appear in the XML document one or more times immediately after the element MENTIONED.

`<!ELEMENT STOCK (FUNDAMENTALS-TABLE, EPS-TABLE, PE-TABLE)>`

As for the STOCK element the element declaration requires this element to be followed in the XML document by the element FUNDAMENTALS-TABLE, which should be followed by the element EPS-TABLE, which in turn should be followed by the element PE-TABLE.

```
<!ATTLIST STOCK
    ID            ID          #REQUIRED
    NAME          CDATA       #REQUIRED
    DISCLOSURE    NMTOKENS    #IMPLIED
>
```

This code assigns attributes to the element STOCK. Attributes assign certain properties such as size, color, alignment, etc., to a class of element. Attribute list declarations indicate the name, data type, and default value (if any)

of each attribute associate d with a particular element. According to this DTD, an attribute list is associated with the element STOCK. This attribute list is formally represented in the DTD by the term !ATTLIST. In XML documents, attributes may appear only within the element start tag. For example, as stated above, the element STOCK is to be followed in the XML document by the elements FUNDAMENTALS-TABLES, EPS-TABLE, and PE-TABLE. But before these elements appear in the actual XML document, the attribute list associated with the STOCK element requires that certain defined values be associated with the STOCK element itself, and these values must appear in the STOCK start tag. In the DTD for this XML document, the first column of the attribute list for the STOCK element creates three attributes with the names ID, NAME, and DISCLOSURE. As with the choice of naming XML elements, the names for these attributes are arbitrary and can be selected by the user during the writing of the DTD. The second column of this attribute list contains the list of attribute types associated with these attributes. The names for these attribute types are set by the XML specification. In XML, there are three attribute types: a string type, a set of tokenized types, and enumerated types. In this particular attribute list for the element STOCK, the ID attribute is associated in the second column of the attribute declaration with the ID attribute type; an ID type must be a valid name symbol. The name must not appear more than once in an XML document as an ID. The next attribute, NAME, is a CDATA type attribute, which means that this attribute can comprise a string of characters; more specifically, CDATA can be used to cause an XML processor to ignore character data that would otherwise be processed as markup. The last attribute, namely, DISCLOSURE, is associated with the NMTOKENS attribute type, which requires the text associated with the DISCLOSURE attribute in the XML document to comprise a text string consisting of a letter or an underscore followed by one or more letters or digits.

The last column of information included in this attribute list corresponds to the attribute default values for each listed attribute. In the DTD of the present invention, the #REQUIRED attribute default value is associated with the ID and NAME attributes. What this means is that in the XML document, the start tag for the STOCK element must provide a value for the ID and NAME attributes, or else the XML document will be declared invalid by the XML processor, which shall be discussed in more detail below. In the attribute list for the STOCK element, the attribute DISCLOSURE is associated with the #IMPLIED attribute default value, which means that if a value is omitted for this attribute from the start tag of the STOCK element in the XML document, the XML processor must notify the application that no value was specified. The XML document, however, will not be declared invalid by such an omission.
<!ELEMENT STOCKREF EMPTY>

This line in the exemplary DTD defines the element STOCKREF, which is established as an empty element, meaning that in the XML document it will not have a corresponding end tag and will therefore not enclose a particular block of text that is to be affected.

```
<!ATTLIST STOCKREF
    ID           ID          #REQUIRED
    NAME         CDATA       #IMPLIED
    DISCLOSURE   NMTOKENS    #IMPLIED
>
```

Empty elements can still be associated with attribute lists, as the above-referenced code demonstrates. As with the previously discussed attribute list for the element STOCK, the attribute list for STOCKREF indicates that three attributes are associated with this particular element. The ID attribute must be a valid name symbol that must not appear more than once in the XML document as an ID. Since the ID attribute for STOCKREF is associated with the #REQUIRED attribute default value, the tag for the STOCKREF element must provide a value for the ID attribute, or else the XML document will be declared invalid by the XML processor.

The NAME attribute is a CDATA type attribute, which as explained above means that in the STOCKREF tag in the XML document, can comprise a string of characters that will not be processed as markup data, regardless of its contents. Since the NAME attribute for STOCKREF is associated with the #IMPLIED attribute default value, its omission from the STOCKREF tag in the XML document will not invalidate the XML document.

The DISCLOSURE attribute is an NMTOKENS type attribute, which means that in the STOCKREF tag in the XML document the text associated with the DISCLOSURE attribute must comprise a text string consisting of a letter or an underscore followed by one or more letters or digits. Since the DISCLOSURE attribute is associated with the #IMPLIED default attribute value, it can be omitted from the tag of the STOCKREF element in the XML document without invalidating the XML document.
<!ENTITY % CELLATTLIST "VALUE CDATA #REQUIRED">

This line in the exemplary DTD is an entity declaration. Entities in XML are similar to macros in word processing applications. They are character strings that serve as abbreviations for pieces of text or markup. As shall be explained below, when encountered by the XML processor, entities are expanded to their associated character strings. There are two kinds of entities: parameter entities and general entities. Parameter entities allow a markup code to be reused several times throughout the exemplary DTD without it having to be retyped a corresponding amount of times. An example of a parameter entity is the entity CELLATTLIST in the exemplary DTD of the present embodiment. The entity CELLATTLIST is a shorthand way to refer to the attribute code "VALUE CDATA #REQUIRED". As explained above, an attribute is code that assigns certain properties to the elements with which they are associated in the exemplary DTD. In this entity, an attribute VALUE has been defined as having a CDATA attribute type, which means that the VALUE attribute is a character string attribute. Further, this entity associates the attribute default value #REQUIRED with the VALUE attribute, meaning that the XML document will be declared invalid if no value for this attribute is specified.

The reason for creating an entity that is associated with this attribute code is that this particular attribute code is to be used many times throughout the remaining portion of the exemplary DTD. Instead of having to type out this attribute code everywhere that it is needed, a user can insert the CELLATTLIST entity wherever the desired attribute code should appear. Every time the XML processor encounters this particular entity, it will expand it to the associated attribute code and interpret it accordingly.

The other type of entity is a general entity, which is not used in the exemplary DTD. This type of entity can be associated with text as well, but it is used in the XML document itself. Thus, if the general entity is defined in the exemplary DTD as <!ENTITY SYMBOL "I can use this text several times without having to type it more than once">, then every time the XML document includes the code &SYMBOL, the XML processor will cause the above text in quotation marks to be displayed to the user.

```
<!ELEMENT FUNDAMENTALS-TABLE (STOCK-
RATING, LATEST-CLOSE, PRICE-RANGE, MARKET-
CAP, YTD-PRICE-CHANGE, CUR-YIELD)>
```

This element declaration defines the FUNDAMENTAL-TABLE element as comprising a content model that includes the elements STOCK-RATING, LATEST-CLOSE, PRICE-RANGE, MARKET-CAP, YTD-PRICE-RANGE, and CUR-YIELD. Thus, when the FUNDAMENTALS-TABLE element appears in the XML document, it is to be followed by the elements of its associated content model in the order presented therein.

```
<!ELEMENT STOCK-RATING EMPTY>
<!ATTLIST STOCK-RATING % CELLATTLIST>
```

These two lines in the exemplary DTD define the element STOCK-RATING as an empty element, and the attribute list for this element is defined by the CELLATTLIST entity, which as discussed above, will be expanded by the XML processor to comprise the parameters VALUE, CDATA, and #REQUIRED.

```
<!ELEMENT LATEST-CLOSE EMPTY>
<!ATTLIST LATEST-CLOSE % CELLATTLIST>
```

These two lines in the exemplary DTD define the element LATEST-CLOSE as an empty element, and the attribute list for this element is defined by the CELLATTLIST entity, which as discussed above, will be expanded by the XML processor to comprise the parameters VALUE, CDATA, and #REQUIRED.

```
<!ELEMENT PRICE-RANGE EMPTY>
<!ATTLIST PRICE-RANGE % CELLATTLIST>
```

These two lines in the exemplary DTD define the element PRICE-RANGE as an empty element, and the attribute list for this element is defined by the CELLATTLIST entity, which as discussed above, will be expanded by the XML processor to comprise the parameters VALUE, CDATA, and #REQUIRED.

```
<!ELEMENT MARKET-CAP EMPTY>
<!ATTLIST MARKET-CAP % CELLATTLIST>
```

These two lines in the exemplary DTD define the element MARKET-CAP as an empty element, and the attribute list for this element is defined by the CELLATTLIST entity, which as discussed above, will be expanded by the XML processor to comprise the parameters VALUE, CDATA, and #REQUIRED.

```
<!ELEMENT YTD-PRICE-CHANGE EMPTY>
<!ATTLIST YTD-PRICE-CHANGE % CELLATTLIST>
```

These two lines in the exemplary DTD define the element YTD-PRICE-CHANGE as an empty element, and the attribute list for this element is defined by the CELLATTLIST entity, which as discussed above, will be expanded by the XML processor to comprise the parameters VALUE, CDATA, and #REQUIRED.

```
<!ELEMENT CUR-YIELD EMPTY>
<!ATTLIST CUR-YIELD % CELLATTLIST>
```

These two lines in the exemplary DTD define the element CUR-YIELD as an empty element, and the attribute list for this element is defined by the CELLATTLIST entity, which as discussed above, will be expanded by the XML processor to comprise the parameters VALUE, CDATA, and #REQUIRED.

```
<!ELEMENT EPS-TABLE (YEAR-NAMES, YEAR-
DATA, YEAR-DATA, YEAR-DATA)>
```

This element declaration establishes an element referred to as EPS-TABLE. According to this element declaration, when the EPS-TABLE appears in the XML document, it is to be followed by the elements YEAR-NAMES, YEAR-DATA, YEAR-DATA, and YEAR-DATA.

```
<!ELEMENT YEAR-NAMES EMPTY>
<!ATTLIST YEAR-NAMES
    VALUE1      CDATA       #REQUIRED
    VALUE2      CDATA       #REQUIRED
    VALUE3      CDATA       #REQUIRED
>
```

These lines of code include an element declaration that establishes the element YEAR-NAMES as an empty element and an attribute list that assigns three attributes (VALUE1, VALUE2, and VALUE3) to the element YEAR-NAMES. This attribute list creates each of these attributes as character string attributes that are required to have a value in the XML document in which the element YEAR-NAMES appears.

```
<!ELEMENT PERIOD-NAMES EMPTY>
<!ATTLIST PERIOD-NAMES
    VALUE1      CDATA       #REQUIRED
    VALUE2      CDATA       #REQUIRED
    VALUE3      CDATA       #REQUIRED
    VALUE4      CDATA       #REQUIRED
    VALUE5      CDATA       #REQUIRED
    VALUE6      CDATA       #REQUIRED
>
```

These lines of code include an element declaration that establishes the element PERIOD-NAMES as an empty element and an attribute list that assigns six attributes (VALUE1, VALUE2, VALUE3, VALUE4, VALUE5, and VALUE6) to the element PERIOD-NAMES. This attribute list creates each of these attributes as character string attributes that are required to have a value in the XML document in which the element PERIOD-NAMES appears.

```
<!ELEMENT YEAR-DATA EMPTY>
<!ATTLIST YEAR-DATA
    VALUE1      CDATA       #REQUIRED
    VALUE2      CDATA       #REQUIRED
    VALUE3      CDATA       #REQUIRED
    VALUE4      CDATA       #REQUIRED
    VALUE5      CDATA       #REQUIRED
    VALUE6      CDATA       #REQUIRED
>
```

These lines of code include an element declaration that establishes the element YEAR-DATA as an empty element and an attribute list that assigns six attributes (VALUE1, VALUE2, VALUE3, VALUE4, VALUE5, and VALUE6) to the element YEAR-DATA. This attribute list creates each of these attributes as character string attributes that are required to have a value in the XML document in which the element PERIOD-NAMES appears.

```
<!ELEMENT PE-TABLE (ABS-PE-CUR, ABS-PE-NEXT,
REL-PE-CUR, REL-PE-NEXT, PRICE-TO-EBITDA,
LT-EPS-GROWTH)>
```

These lines of code include an element declaration that establishes the PE-TABLE element, which when it appears in the XML document must be followed by the various elements included within the parentheses of this declaration.

```
<!ELEMENT ABS-PE-CUR EMPTY>
<!ATTLIST ABS-PE-CUR VALUE CDATA #IMPLIED>
```

These lines of code include an element declaration that establishes ABS-PE-CUR as an empty element. This element is one of the elements that must follow the element PE-TABLE in the XML document. The attribute list for the element ABS-PE-CUR assigns to it an attribute referred to as VALUE, which may comprise character string data. Since the attribute default value in this case is #IMPLIED, no information need be assigned in the XML document to the attribute VALUE.

<!ELEMENT ABS-PE-NEXT EMPTY>
<!ATTLIST ABS-PE-NEXT VALUE CDATA #IMPLIED>

These lines of code include an element declaration that establishes ABS-PE-NEXT as an empty element. This element is one of the elements that must follow the element PE-TABLE in the XML document. The attribute list for the element ABS-PE-NEXT assigns to it an attribute referred to as VALUE, which may comprise character string data. Since the attribute default value in this case is #IMPLIED, no information need be assigned in the XML document to the attribute VALUE.

<!ELEMENT REL-PE-CUR EMPTY>
<!ATTLIST REL-PE-CUR VALUE CDATA #IMPLIED>

These lines of code include an element declaration that establishes REL-PE-CUR as an empty element. This element is one of the elements that must follow the element PE-TABLE in the XML document. The attribute list for the element REL-PE-CUR assigns to it an attribute referred to as VALUE, which may comprise character string data. Since the attribute default value in this case is #IMPLIED, no information need be assigned in the XML document to the attribute VALUE.

<!ELEMENT REL-PE-NEXT EMPTY>
<!ATTLIST REL-PE-NEXT VALUE CDATA #IMPLIED>

These lines of code include an element declaration that establishes REL-PE-NEXT as an empty element. This element is one of the elements that must follow the element PE-TABLE in the XML document. The attribute list for the element REL-PE-NEXT assigns to it an attribute referred to as VALUE, which may comprise character string data. Since, the attribute default value in this case is #IMPLIED, no information need be assigned in the XML document to the attribute VALUE.

<!ELEMENT PRICE-TO-EBITDA EMPTY>
<!ATTLIST PRICE-TO-EBITDA VALUE CDATA #IMPLIED>

These lines of code include an element declaration that establishes PRICE-TO-EBITDA as an empty element. This element is one of the elements that must follow the element PE-TABLE in the XML document. The attribute list for the element PRICE-TO-EBITDA assigns to it an attribute referred to as VALUE, which may comprise character string data. Since, the attribute default value in this case is #IMPLIED, no information need be assigned in the XML document to the attribute VALUE.

<!ELEMENT LT-EPS-GROWTH EMPTY>
<!ATTLIST LT-EPS-GROWTH VALUE CDATA #IMPLIED>

These lines of code include an element declaration that establishes LT-EPS-GROWTH as an empty element. This element is one of the elements that must follow the element PE-TABLE in the XML document. The attribute list for the element LT-EPS-GROWTH assigns to it an attribute referred to as VALUE, which may comprise character string data. Since the attribute default value in this case is #IMPLIED, no information need be assigned in the XML document to the attribute VALUE.

<!ELEMENT SUMMARY (CAPSULE+)>

This element declaration establishes the element SUMMARY. The content model of this element declaration recites the element CAPSULE followed by a +sign. What the +sign means is that the element SUMMARY must be followed in the XML document by at least one occurrence of the CAPSULE element.

<!ELEMENT CAPSULE (#PCDATA)>.

This element declaration establishes the element CAPSULE. The term #PCDATA that is provided within the content model for this element is a declaration that this element is to enclose (within its start and end tags) in the XML document parsed character data. "Parsed character data" means data that is to be parsed (i.e., processed) to determine whether each character is markup or simply character data.

<!ELEMENT DETAILS (POINT+)>

This element declaration establishes the element DETAILS. The content model of this element declaration recites the element POINT followed by a + sign. What the +sign means is that the element SUMMARY must be followed in the XML document by at least one occurrence of the CAPSULE element.

<!ELEMENT POINT (HEADER, EXPLANATION)>

This element declaration establishes the element POINT. The content model for this element requires that in the XML document the appearance of POINT must be followed by the element HEADER, followed by the element EXPLANATION.

<!ELEMENT HEADER (#PCDATA)>

This element declaration establishes the element HEADER as one that is to comprise parsed character data in the XML document.

<!ELEMENT EXPLANATION (#PCDATA)>

This element declaration establishes the element EXPLANATION as one that is to comprise parsed character data in the XML document.

XML Document

Now that the elements that are defined in the exemplary DTD have been explained, the use of these elements in the exemplary XML document provided at the end of the specification can now be understood. As with the explanation of the exemplary DTD, the explanation of the XML document shall proceed on a line-by-line basis.

<XML VERSION+"1.0"ENCODING+"UTF-8"!>
<!DOCTYPE FINCORP.MORNING SYSTEM "Note.dtd">

As explained above, the first of these two lines of code in the exemplary XML document determines the version of XML that is to be used and the character set according to which the character data included in this document is to be encoded. The second of these two lines of code names the document as FINCORP.MORNING and includes a reference to an external DTD named as "Note.dtd". Since the XML document includes a specific reference to a DTD, this XML document can be validated by the XML processor, meaning that the manner in which every element appears in the XML document can be checked-against the element declarations in the DTD to ensure that no illegal element use occurs in the XML document.

As indicated by the DTD, the XML document may include both empty and non-empty elements. Non-empty elements include a start tag and an end tag for surrounding other elements and text data. Empty elements include only start tags and do not enclose other elements or text data. An end tag for a non-empty element generally appears the same as the start tag for that element, except that the end tag begins with an angled bracket followed by a slash character (i.e., </). Thus, an element PARAGRAPH will have a start tag <PARAGRAPH>and an end tag </PARAGRAPH>.

Another way that a start tag for an element may appear differently than its corresponding end tag applies to elements for which attributes have been assigned. In that case, the start tag for the element will include not only the element name surrounded by angled brackets, but also the name and assigned value of each attribute.

As explained above, the rules of proper nesting require that in an XML document all of the elements of a content model for a non-empty element must appear within the start and end tags for that non-empty element. For instance, if an element A has been declared in a DTD as <!ELEMENT A (B, C)>, then these elements should appear in the XML text as follows:

```
<A>
  <B>
  •
  •
  •
  •
  <B>
  <C>
  •
  •
  •
  •
  </C>
</A>
```

Turning now to the code set forth in the exemplary XML document, the code corresponding to the TITLE, SUB-TITLE. AUTHOR ID, RELEASED DATE, and AVAILABLE DATE elements correspond to elements that provide general textual data about the document. The type of general text data associated with these elements is self-evident from the names of these elements. Since these particular elements are not specifically defined in the DTD, they are considered to be of the ANY type.

```
<USC-STOCK-NOTE>
  <STOCKS>
    <DESCRIBED>
      <PERIOD-NAMES VALUE1="Jul" VALUE2=
        "Oct" VALUE3="Jan" VALUE4="Apr"
        VALUE5="FY" VALUE6="CY"/>
```

These lines of the XML document introduce the start tags of the USC-STOCK-NOTE, STOCKS, DESCRIBED, and PERIOD-NAMES elements. The PERIOD-NAMES element is an empty element, as indicated by the "/>" that encloses its start tag. In this start tag for the PERIOD-NAMES element, values have been assigned to each of the attributes for this element.

<STOCK ID="XYZ" NAME="XYZ Corporation" DISCLOSURE="M CF CS">

This line of code corresponds to the start tag for the STOCK element, which from its name indicates that its markup text will correspond to information about a particular stock. This start tag includes the attributes ID, NAME, and DISCLOSURE. From the information that is assigned to these attributes, it is evident that the element STOCK is intended to markup textual information that relates to the stock of XYZ Corporation.

| <FUNDAMENTAL-TABLE> | |
|---|---|
| <STOCK-RATING | VALUE="RL"/> |
| <LATEST-CLOSE | VALUE="11.94"/> |
| <PRICE-RANGE | VALUE="17–8"/> |
| <MARKET-CAP | VALUE="1105.05"/> |

-continued

| | |
|---|---|
| <YTD-PRICE-CHANGE | VALUE="21%"/> |
| <CUR-YIELD | VALUE="0.0%/> |
| </FUNDAMENTALS-TABLE> | |

These lines of code in the XML document correspond to the FUNDAMENTAL-TABLE element and its associated elements. What the FUNDAMENTAL-TABLE element does is markup textual information regarding certain financial characteristics of XYZ Corp. The elements nested within the FUNDAMENTAL-TABLE element serve as additional markups that further categorizes and describes this financial information. For instance, these elements markup information pertaining to the latest closing price of the company's stock, the price range of the stock, the market capitalization of the company, and the stock rating, which is provided by the institution that gathered and organized this Financial information.

```
<EPS-TABLE>
  •
  •
  •
<PE-TABLE>
```

The EPS-TABLE and PE-TABLE also markup financial information regarding XYZ Corp. The EPS element marks up information related to the earnings-per-share of XYZ Corp., and the PE-TABLE element includes information relating to the price-to-earnings ratio of the company. The only element nested within the PE-TABLE element that has been assigned a value is the LT-EPS-GROWTH element, which marks up information pertaining to long-term earnings-per-share growth; in particular, the attribute VALUE that is assigned to this element is associated with the value 45%. Although other elements are nested within the PE-TABLE element, no values have been associated with these other elements. These omissions are valid for these elements because, according to the DTD discussed above, the attribute list for each of these elements assigns to each of them an attribute with an #IMPLIED default value, meaning that the XML document need not provide a value for such an attribute. Had the attribute list in the DTD assigned a #REQUIRED default value to the attributes of each of these elements associated with the PE-TABLE element, then the XML document would have to provide a value for each of these attributes, or the XML document would be declared invalid by the XML processor.

```
<SUMMARY>
  <CAPSULES>
```

As indicated in the XML document provided in the present specification, these elements markup narrative textual information regarding XYZ Corp. Such information may relate to further financial information or new developments in the company's business strategy that affect the company's stock price. The element CAPSULE is repeated several times in this document, and each appearance of this element can markup text related to text that covers different company issues. For example, the first appearance of CAPSULE marks up text that relates to Network Services revenue for XYZ Corp. The next CAPSULE element marks up text that relates to an unlimited access plan intended to slow subscriber attrition. Because the declaration for the element SUMMARY in the DTD allows the element CAPSULE to be used one or more times in the XML documents the narrative text to be included in the XML document can be marked up and subdivided by any number of CAPSULE tags.

```
<DETAILS>
  <POINT>
    <HEADER>STRENGTH IN NETWORK
SERVICES</HEADER>
    <EXPLANATION>
```

These elements also markup narrative text in the XML document. The ability of XML to allow markup elements to be designed and customized permits text information to be marked up by elements With names that provide descriptive information of the text enclosed by their respective start and end tags. In this document, a decision was made to markup one type of text with a SUMMARY/CAPSULE element combination, and to markup another kind of text with a DETAILS/POINT/HEADER/EXPLANATION element combination. In particular, the text enclosed by each EXPLANATION element is a more detailed discussion of a topic discussed in text enclosed by a corresponding CAPSULE element. For example, the first block of text enclosed by the CAPSULE element is directed to a general discussion of the Network Services division of XYZ Corp.; the first block of text enclosed by the EXPLANATION element contains a more detailed discussion of this division. Of course, the text of the XML document need not have been marked up in this manner; because of the flexibility offered by XML, other types of elements that organize text according to other logical relationships could have been devised for the information that is marked up in this XML document.

Document Storage and Retrieval System

Now that the manner in which text documents are formatted according to descriptive logical structures using XML has been described in accordance with the exemplary embodiment of the present invention, the discussion shall now turn to describing a system that stores and disseminates such XML documents on a networked basis. FIG. 1 illustrates the architecture of such a system in accordance with an exemplary embodiment of the present invention. For ease of description, the embodiment of the present invention described herein is that used for the electronic distribution of investment research reports and morning meeting notes ("reports") to investors via the Internet's World Wide Web ("WWW"). However, the invention is not so limited, and can be used, where appropriate, for the electronic distribution of other types of information via other types of networks.

As used herein, the terms "investor" and "user" include any end user who is permitted to receive or access information via the present invention, such as, for example, customers of brokerage and investment banking firms, employees of brokerage and investment banking firms, investment advisors, brokers, bankers, portfolio and fund managers, journalists, analysts, economists, university professors, MBA students, etc.

Referring now to FIG. 1, there is illustrated an overall system architecture according to the present invention. A central repository server 2 is coupled, via a central site 1, to one or more remote contributor workstations 14, 16, 18, 19. The contributor workstations 14, 16, 18, 19 are used by brokerage and investment banking firms to submit reports to the repository server 2. Optionally, the contributor workstations 14, 16, 18, 19 may be coupled to the repository server 2 via a proprietary network comprising a plurality of contributor servers 20, 22. Alternatively or additionally, a contributor workstation 24 may provide reports to the repository server 2 via the Internet.

In the representative embodiment, the contributor workstations execute a program called Multex Contributor™, described in detail in the user manual titled "MX Contributor-User Guide" available from Multex Systems, Inc. of New York, N.Y. and expressly incorporated herein by reference. The Multex Contributor™ program is a real-time Windows-based document indexing and transfer program used to disseminate reports to the central site 1. Each contributor workstation 14, 16, 18, 19 is provided with any suitable XML generator software module 30, such as the DataChannel XML Generator, for example, which converts all input text file into an XML file on the basis of a DTD. The present invention is also compatible with other well-known software modules that accepts other forms of input documents, such as DOC files, and converts them into XML documents as well. Regardless of the type of input document that is created at the contributor workstation 14, 16, 18, 19, the present invention creates an XML document in which the text of such an input document is marked-up in accordance with the mark-up elements of the DTD of the exemplary embodiment. By marking up input text in accordance with the elements declared in the DTD of the present invention, the system according to an exemplary embodiment of the present invention allows a search engine to search the actual text contents of the document itself, instead of searching through an associated record that provides a mere summary of the document text, as is done by the previously proposed systems discussed above. In preparing a report that is to be submitted to the central site 1, the contributor writes the report using any suitable word processing application such as Microsoft Word or Corel WordPerfect. Once the report is finished, the XML generator software module 30 translates the information content of the report to XML. For reports that are to be translated into valid as opposed to well-formed, XML documents, the XML report would be structured in accordance with a predetermined DTD, such as the one discussed above, that is made available to the XML generator module 30. Once a contributor has completed the preparation of an XML report, the Multex Contributor™ program electronically transfers the report to the central site 1 either directly or through contributor servers 20, 22. Thus, by transmitting reports in XML form to a central site 1, the present invention not only transfers character data that can be viewed later on at user computers 6, 8, but it also transfers with this character data markup elements that provide a structured description of the contents of that character data. Alternatively, the XML generator module 30 may be provided at the central site 1, in which case the reports would be transmitted according to any suitable word processing file and translated to XML as they are received at the central site 1.

In an alternative embodiment, an "auto-contributor" program may be used to automatically contribute reports. The auto-contributor program executes, for example, on a contributor workstation 14, 16, 18, 19 and provides a mechanism for automatically contributing one or a number of documents. This mechanism is particularly well suited for "high volume" contributors. In particular, after a predetermined number of XML reports have been prepared and stored on a contributor workstation, the auto-contributor would access these reports on the basis of their the location or address on the contributor workstation storage device, e.g., file path. After accessing these reports, the auto-contributor program transmits them to the central site 1.

At the central site 1, the reports are processed. Typically, the central site comprises a network of computer processors. Once a report is received at the central site it may be read by an XML processor 40, which can be used at least to validate each incoming report in accordance with their respective embedded DTDs. An XML processor is a software module that reads and provides access to the content and structure of XML documents. Any suitable validating XML processor, such as Microsoft™ XML Parser in Java and Microsoft™ XML Parser in C++, can be implemented as the XML processor used in the present invention. After a report has been processed by the XML processor 40, the XML report is transferred electronically to the repository server 2.

Where desired, the repository server 2 can also receive, store and enable the distribution of other useful information, such as, for example, news reports received from wire services, government reports, product reviews, etc.

The repository server 2 comprises or is coupled to an index server 11, which may comprise Microsoft™ Index Server V2.0. Server 11 indexes each received XML document in accordance with both the structural and text content of each received document. In particular, for the purpose of indexing at server 11, each XML document received from the contributor workstations 14, 16, 18, 19 is converted to a certain HTML format that is understood by the index server 11. This format used by the index server 11 is merely a convention regarding the use of the standard HTML <META>tag. According to this convention, any NAME, CONTENT pair in this tag is understood by the index server 11 as structured information. The following information is an example of an HTML fragment that is structured in index server 11 according to this convention:

<HEAD>
    <META NAME="RELEASE_DATE" CONTENT="98/3/17"
</HEAD>

Thus, when index server 11 reads this information, it will produce the structured XML field RELEASE_DATE having the value 98/3/17. As a result of this operation, the actual contents of the XML document can be searched by a search engine acting upon a particular search query provided by a user at one of user computers 6, 8. For searching the index server 11, user computers 6, 8 may use any suitable search engine, such as Fulcrum™ Full Text Engine, for example, as the search engine. The index server 11 is coupled to a database storage device 10.

The repository server 2 provides investors with lists of reports received from the contributor workstations 14, 16, 18, 19 and allows investors to request lists of reports that fit certain criteria. The investor can select reports from these lists to down-load, view and/or print. Generally, lists of reports can be generated by the web server 4.

The contributor of a report can be notified that a particular investor has accessed that report. The repository server 2 maintains for each report a list of those who accessed that report. The repository server 2 can transmit that list to the report's contributor on a regular basis and/or when requested by the contributor.

The repository server 2 is Coupled to a web server 4 which in turn is coupled to the Internet via, for example, a T1 or ISDN connection. The web server 4 is a high powered server computer that runs a web server program. In the representative embodiment, the web server 4 executes, for example, Netscape's Commerce Server program. The web server program allows web pages (in HTML format) to be accessed by investors. The web server 4 also executes other programs and subroutines as required.

Each investor has a user computer 6, 8, such as, for example, a personal computer with an Intel Pentium processor and a fast modem. The user computer 6, 8 can connect with the Internet via, for example, a commercial Internet Service Provider. In the representative embodiment, the user computer 6, 8 executes an Internet browser program, such as, for example, Netscape's Navigator browser program. The Internet browser can read HTML or XML format, and can also communicate with other programs. Once a search query from a user has resulted in the identification of certain XML reports in the repository server 2 that satisfy the query, a visual representation of these reports can be transferred electronically to the user computer 6, 8. The visual representations of these documents may be formatted as HTML. DOC, or PDF files; the user computer would be provided with the appropriate viewing software for displaying such files. For example, if the downloaded report is in the form of a PDF file, the viewing software would be the Acrobat Exchange™ Interface program, available from Adobe Systems, that directs Acrobat Exchange™ or Acrobat Reader™ to load and display downloaded ".pdf" files.

Alternatively, the XML reports themselves, instead of a visual representation thereof, may be downloaded form the repository server 2 to the user computer 6, 8. In order to access the information in these reports, the user computer 6, 8 would employ an XML processor 40, as discussed above. Furthermore, in order to display such accessed information, the user computer 6, 8 could be provided with an XSL (Extended Stylesheet Language) processor 50, such as Microsoft™ XSL Processor. The need for this processor 50 is due to the inability of XML to provide any information on how the contents of XML documents are to be displayed. XSL is at stylesheet language designed to be used with XML documents, it is intended to associate formatting information with the elements of the XML document in order to produce a formatted output suitable for display. In particular, the XML information read by the XML processor 40 is merged with the formatting specification that is derived from the active style sheets of the XSL processor 50. This merging produces a formatted output comprising a plurality of flow objects, such as paragraphs and tables. The particular elements of the XML document are associated with the flow objects by construction rules, which contain a "pattern" portion to identify specific elements in the XML document and an "action" portion to specify how that element is to be displayed. Specifically, the action portion of the construction rule state what flow objects are to be created for the element identified by the pattern portion of the construction rule. For example, a construction rule that specifies a particular element may require for that element a flow object in which the font size is set to 12 pt. Thus, the text associated with that element will be displayed as 12 pt text.

XSL is not the only style sheet language that may be used for displaying XML information. Other types of style sheet languages that are compatible with XML include, but are not limited to, CSS (Cascading Style Sheets) and DSSSL (Document Style Semantics and Specification Language).

Because of the descriptive power provided by the XML elements, which are used to mark up the text data of the financial reports created at the contributor workstations 14, 16, 18, and 19, investors who wish to access particular reports can formulate search queries that are very specific to their researching needs. For example, the XML DTD described above defines several elements that are useful for describing the financial information of a corporation. In particular, this DTD allows such financial information as a corporation's stock price, year-to-date change, P/E ratio, and market capitalization to be marked up by elements with names that provide an indication of what type of information is enclosed within their respective tags. For example, the MARKET-CAP element is used to mark up text information relating to a company's market capitalization, and the YTD- PRICE-CHANGE element is used to mark up text information relating to the year-to-date price change in a stock's price. Since the elements and associated text of each report maintained in repository server 2 have been indexed by index server 11, an investor using computer 6, 8 can electronically transmit to central site 1 a request for reports that satisfy a very narrowly crafted search condition. For example, a user can issue a request for reports that relate to stocks with a P/E ratio less than 25, or for reports that relate to companies with a market capitalization between 1.5 and 3.0 billion dollars. When the web server receives such a request, it accesses the index server 11 and searches the text associated with the PE-TABLE and MARKET-CAP elements of every stored XML report. As a result, the web server can pull from the index server 11 those XML reports that satisfy the criteria of the search query. The format of the search queries that are inputted at user computer 6, 8 is specific to the type of server used. Thus, if the server 11 is embodied as Microsoft™ Index Server V2.0 and used in conjunction with the Fulcrum™ Full Text Engine, then a user at user computer 6, 8 could phrase particular search queries that are phrased in accordance with vendor-specific formats or SQL extensions. For example, if the server 11 is indeed embodied as Microsoft™ Index Server V2.0, and a user wanted to retrieve from central site 1 those documents that were released after 3/1/98, contain the word "buy", and pertain to companies with market capitalizations greater than 100 million dollars, the user would phrase a search query to appear as follows:

(@reldate>98/3/1) & (@market-cap>100) & buy. This particular search query has three constituent sub-queries: @reldate>98/3/1; @market-cap>100; and "buy". In this example, they are associated to each other in terms of the boolean operator &: in formulating other search queries, any other boolean operator, such as OR, NOR, OR NOT, for example, may be used. The last sub-query is an example of what is referred to herein as all unrestricted sub-query because it requires the search engine to look for the word "buy" anywhere within each searched document. Thus, in unrestricted sub-queries, the search condition may comprise a single item of text. Of course, multiple unrestricted sub-queries may be concatenated to each other using boolean operators to formulate search queries that require documents that contain several, or alternative, items of text, or any combination thereof. The other two search queries are examples of what are referred to herein as restricted sub-queries because they restrict the search to only certain portions of each searched document. The text portion preceded by the "@" symbol of each restricted sub-query is referred to herein as the search field, and the value that is to be searched within the search field is referred to herein as the search value, which may correspond not just to numerical text, but to alphabetical or alphanumeric text as well. Within each sub-query, the search field may be related to its associated search value by a search operation: in this example, the search operation is the "greater than" operation. In restricted sub-queries, the search condition may be defined by the search operation and the search value together, and the search field defines where in the XML document that search condition is to be satisfied if that XML document is to be deemed to have satisfied that particular sub-query. Thus, in each restricted sub-query, the portion of each XML document to which the search engine is limited by the search field corresponds to the text that is marked-up by an element identified by the search field. For example, the first search sub-query of the above example limits the search engine to look for text that satisfies the ">98/3/1" condition only in text that is marked up by the RELEASED DATE element in each stored XML document. Similarly, the search field "market-cap" limits the search engine to text marked up by the MARKET-CAP in looking for text that satisfies the ">100" condition.

When viewed in its entirety, what this particular search query requires of the search engine is to select and provide to the requesting user computer 6, 8 each stored XML document (1) that includes a RELEASED DATE element that marks up any date after 98/3/1, (2) that includes a MARKET-CAP element that marks up any value greater than 100, and (3) that includes the word "buy" anywhere within the document. Thus, the present invention allows a user to use the descriptive power provided by these XML mark-up elements to formulate search queries that are specifically tailored to finding documents that have certain desired financial information. The exemplary search query discussed above is tailored for finding documents released after a certain date that discuss companies with a market capitalization above a certain amount. But that is not the only type of documents that are retrievable by the system of the present invention. Based on the wide variety of XML elements that mark-up the documents in server 11, users can also employ the present invention to find, for example, documents that discuss companies that have had a certain earnings-per-share growth over a identified period of time, or companies the stocks of which have exhibited a particular year-to-date price change.

Figure 2:
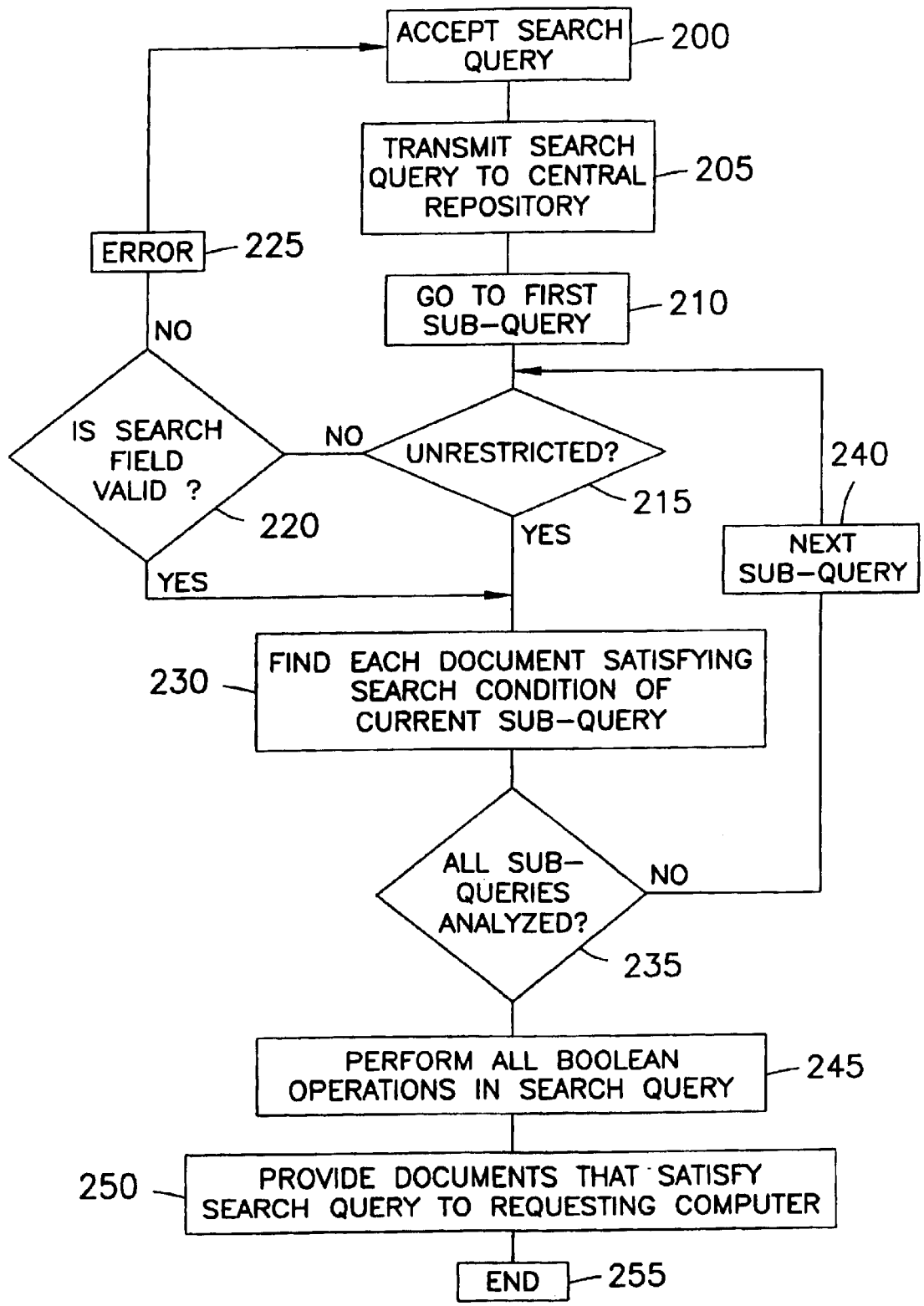
FIG. 2 illustrates a flow diagram representing a method for retrieving text documents on the basis of a search query formulated by a user.

FIG. 2 illustrates a flow diagram corresponding to the document search operation of the present invention. After accepting a search query formulated by a user (step 200), user computer 6, 8 transmits the search query to central repository 2 (step 205).

At this point, the search engine goes to the first sub-query (step 210) and determines whether the current sub-query is restricted or unrestricted (step 215). If the current sub-query is unrestricted, the search engine finds each XML document in database 10 that satisfies the search condition, usually an item of text, of the unrestricted sub-query (step 230). If the current sub-query is restricted, the search engine determines whether the search field of the current sub-query is valid (step 220), meaning that the search engine will determine whether the search field identifies a legal mark-up element, either as defined by the particular DTD in use or as defined by the XML meta-language itself. If the search field does not correspond to a legal mark-up element, the search engine will issue an error message to be displayed at user computer 6, 8 (step 220), and the user will be prompted to reformulate the search query. If the search field of the current, restricted sub-query is valid, the search engine determines which documents of database 10 satisfy the search condition of this Sub-query (step 230). For restricted sub-queries, the search condition is to be satisfied by that text of each XML document that is marked-up by the element identified by the search field. Once the search engine determines which documents satisfy the search condition of the current sub-query, it determines whether all the sub-queries of the search query have been satisfied. If not, the search engine proceeds to the next sub-query (step 240) and repeats steps 215-235 in the manner discussed above. If all of the sub-queries have been analyzed, then the search engine performs any boolean operations that are included in the search query on the search results derived from the sub-queries (step 245). The documents that result from this boolean operation are then provided to the requesting a user computer 6, 8 as the documents that satisfy the search criteria set forth by the user (step 255).

XML EXEMPLARY DTD

```
<!ELEMENT USC-STOCK-NOTE (STOCKS, SUMMARY, DETAILS?)>
<!ELEMENT STOCKS (DESCRIBED, MENTIONED?)> <!ELEMENT DESCRIBED
(PERIOD-NAMES, STOCK, STOCK?, STOCK?, STOCK?)>
<!ELEMENT MENTIONED (STOCKREF+)>
<!ELEMENT STOCK (FUNDAMENTALS-TABLE, EPS-TABLE, PE-TABLE)>
    <!ATTLIST STOCK
    ID        ID         #REQUIRED
    NAME CDATA           #REQUIRED
DISCLOSURE NMTOKENS      #IMPLIED
<!ELEMENT STOCKREF EMPTY>
<!ATTLIST STOCKREF
    ID        ID         #REQUIRED
    NAME CDATA           #IMPLIED
    DISCLOSURE     NMTOKENS      #IMPLIED
<!ENTITY % CELLATTLIST "VALUE CDATA #REQUIRED">
<!ELEMENT FUNDAMENTALS-TABLE (STOCK-RATING, LATEST-CLOSE,
PRICE-RANGE, MARKET-CAP, YTD-PRICE-CHANGE, CUR-YIELD)>
    <!ELEMENT STOCK-RATING EMPTY>
    <!ATTLIST STOCK-RATING %CELLATTLIST;>
    <!ELEMENT LATEST-CLOSE EMPTY>
    <!ATTLIST LATEST-CLOSE %CELLATTLIST;>
    <!ELEMENT PRICE-RANGE EMPTY>
    <!ATTLIST PRICE-RANGE %CELLATTLIST;>
    <!ELEMENT MARKET-CAP EMPTY>
    <!ATTLIST MARKET-CAP %CELLATTLIST;>
    <!ELEMENT YTD-PRICE-CHANGE EMPTY>
    <!ATTLIST YTD-PRICE-CHANGE %CELLATTLIST;>
    <!ELEMENT CUR-YIELD EMPTY>
    <!ATTLIST CUR-YIELD %CELLATTLIST;>
    <!ELEMENT EPS-TABLE (YEAR-NAMES, YEAR-DATA, YEAR-DATA,
    YEAR-DATA)>
    <!ELEMENT YEAR-NAMES EMPTY>
    <!ATTLIST YEAR-NAMES
    VALUE1    CDATA      #REQUIRED
    VALUE2    CDATA      #REQUIRED
    VALUE3    CDATA      #REQUIRED
<!ELEMENT PERIOD-NAMES EMPTY> <!ATTLIST PERIOD-NAMES
    VALUE1    CDATA      #REQUIRED
    VALUE2    CDATA      #REQUIRED
    VALUE3    CDATA      #REQUIRED
    VALUE4    CDATA      #REQUIRED
    VALUE5    CDATA      #REQUIRED
    VALUE6    CDATA      #REQUIRED
    <!ELEMENT YEAR-DATA EMPTY>
    <!ATTLIST YEAR-DATA
    VALUE1    CDATA      ""
    VALUE2    CDATA      ""
    VALUE3    CDATA      ""
    VALUE4    CDATA      ""
    VALUE5    CDATA      ""
    VALUE6    CDATA      ""
>
<!ELEMENT PE-TABLE (ABS-PE-CUR, ABS-PE-NEXT, REL-PE-CUR,
REL-PE-NEXT, PRICE-TO-EBITDA, LT-EPS-GROWTH)>
<!ELEMENT ABS-PE-CUR EMPTY>
<!ATTLIST ABS-PE-CUR VALUE CDATA #IMPLIED>
<!ELEMENT ABS-PE-NEXT EMPTY>
<!ATTLIST ABS-PE-NEXT VALUE CDATA #IMPLIED>
<!ELEMENT REL-PE-CUR EMPTY>
<!ATTLIST REL-PE-CUR VALUE CDATA #IMPLIED>
<!ELEMENT REL-PE-NEXT EMPTY>
<!ATTLIST REL-PE-NEXT VALUE CDATA #IMPLIED>
<!ELEMENT PRICE-TO-EBITDA EMPTY>
<!ATTLIST PRICE-TO-EBITDA VALUE CDATA #IMPLIED>
<!ELEMENT LT-EPS-GROWTH EMPTY>
<!ATTLIST LT-EPS-GROWTH VALUE CDATA #IMPLIED>
<!ELEMENT SUMMARY (CAPSULE+)>
<!ELEMENT CAPSULE (#PCDATA)>
<!ELEMENT DETAILS (POINT+)>
<!ELEMENT POINT (HEADER, EXPLANATION)>
<!ELEMENT HEADER (#PCDATA)>
<!ELEMENT EXPLANATION (#PCDATA)>
```

EXEMPLARY XML DOCUMENT

```
<?XML VERSION="1.0" ENCODING="UTF-8" ?>
<!DOCTYPE FINCORP.MORNING SYSTEM "Note.dtd">
<FINCORP.MORNING>
```

-continued

```
    <TITLE>XYZ -- Q1 1998 Conference Call Highlights;
RL</TITLE>
    <SUBTITLE>XYZ Corporation</SUBTITLE> <AUTHOR
ID="FINCORP.JONES" NAME="Michael Jones" PHONE="(212)
999-8888" DEPT="Equity Research"/>
    <RELEASED DATE="August 22, 1997" TIME="11:02 AM" />
<AVAILABLE DATE="8/22/97" TIME="11:07" />
    <USC-STOCK-NOTE>
        <STOCKS>
            <DESCRIBED>
                <PERIOD-NAMES VALUE1="Jul" VALUE2="Oct"
VALUE3="Jan"
VALUE4="Apr" VALUE5="FY" VALUE6="CY" />
                <STOCK ID="XYZ" NAME="XYZ
Corporation" DISCLOSURE="M
CF CS">
                    <FUNDAMENTALS-TABLE>
                        <STOCK-RATING    VALUE="RL" />
                        <LATEST-CLOSE    VALUE="11.94" />
                        <PRICE-RANGE     VALUE="17–8" />
                        <MARKET-CAP      VALUE="1105.05"
/>
                        <YTD-PRICE-CHANGE      VALUE="21%"
/>
                        <CUR-YIELD       VALUE="0.0%" />
                    </FUNDAMENTALS-TABLE>
                    <EPS-TABLE>
                        <YEAR-NAMES VALUE1="1999 FY"
VALUE2="1998 FY" VALUE3="1997
FY(A)" />
                        <YEAR-DATA />
                        <YEAR-DATA VALUE1="–0.04A" />
                        <YEAR-DATA VALUE1="–0.19"
VALUE2="–0.26" VALUE3="–0.15"
VALUE4="–0.13" VALUE5="–0.73" VALUE6="–0.12"/>
                    </EPS-TABLE>
                    <PE-TABLE>
                        <ABS-PE-CUR />
                        <ABS-PE-NEXT />
                        <REL-PE-CUR />
                        <REL-PE-NEXT />
                        <PRICE-TO-EBITDA />
                        <LT-EPS-GROWTH VALUE="45%"
/>
                    </PE-TABLE>
                </STOCK>
            </DESCRIBED>
        </STOCKS>
        <SUMMARY>
            <CAPSULE>
                Network Services revenues grew 27% YOY
contributing 37% of total
                revenues. Honeywell and Imation were two of S7
new accounts opened in
                the quarter, bringing the total to 1,2S7. The new
accounts
represent
                multi-year revenue streams that will likely have a
positive impact in
                the next few quarters. Peter Van Camp, a senior
executive within the
                company, was promoted to President of the Network
Services
division.
</CAPSULE>
                        <CAPSULE>
    The new $24.95 unlimited access plan,
designed to slow subscriber
    attrition, will go into effect on Oct. 1 in the U.S. and
Canada.
All
    pre-existing pricing plans will stay in effect. Since
about 10% of the
    existing CSi subscriber base spends more than $2S per
month,
management
    warned of a possible downward impact on gross margins and
delay to
a
```

-continued

```
        break-even quarter as a result of this fixed price plan.
In the
past,
        management had indicated that they expect a break-even
quarter in
mid-
                to late-fiscal-1998.
            </CAPSULE>
            <CAPSULE>
                H&R Block, XYZ's parent company, management
indicated that
they
        continue to be in talks regarding business combinations
with third
        parties. In case an agreement is not reached, HRB will
continue with
its plan to spin-off its 80.1% stake in XYZ.
At yesterday's close
    ($11
        15/16), XYZ is trading at a price-to-revenue multiple for
calendar
1997
        of 1.3. In the quarter reported, XYZ's tangible book
value was
$6.50,
                with approximately $1.44 in cash and
equivalents, and $1.82 including
                    short-term investments representing a $7
million increase in cash
during
                the quarter. We continue to view XYZ
shares as a long-term
turnaround
                investment opportunity given its core assets.
            </CAPSULE>
        </SUMMARY>
        <DETAILS>
            <POINT>
                <HEADER>STRENGTH IN NETWORK SERVICES</HEADER>
                <EXPLANATION>
            Peter Van Camp, a senior executive
within
                the company, was appointed President of the
1,100 person division.
In the
                quarter ended, Network Services revenues grew
27% YOY contributing
37% of
                total revenues. Honeywell and Imation
were two of 57 new accounts
opened
                in the quarter, bringing the total to 1,257.
The new accounts represent
                multi-year revenue streams that will likely
have a positive impact
in the
                next few quarters. About 40% of the division's
workforce is 'out
in the
                field', spread out in 28 domestic and 3
International offices.
The
                remaining 60% of the division's
workforce is responsible for
managing and
                supporting the infrastructure.
            </EXPLANATION>
        </POINT>
        <POINT>
                <HEADER>INTRODUCING NEW PRICING PLAN</HEADER>
                <EXPLANATION>
                    XYZ formally announced the new flat-
fee                 $24.95 unlimited access usage plan
for
CSi. The new pricing
designed to
                slow subscriber attrition will go into
effect on Oct. 1 in the
U.S. and
```

-continued

```
                Canada. All pre-existing pricing plans
will stay in effect with consumers
                having a choice. Since usage-based
pricing is the predominant pricing
                schemes used by most competitors outside
of the U.S., XYZ
management is
                still undecided on a roll-out of the flat-
fee plan in Europe and
    International regions. Since about 10% of the existing
CSi
subscriber base
    spends more than $25 per month, management warned of a
possible downward
    impact on gross margins and a delay to a break-even
quarter as a result of
    this fixed price plan. In the past, management had
indicated that
they
    expect a break-even quarter in mid- to late-fiscal-1998.
Management
    reviewed the results of a limited test of the unlimited
access plan where
    two-thirds of all subscribers increased their usage on
the service from
                prior levels.
                    </EXPLANATION>
                </POINT>
                <POINT>
                <HEADER>Q1 FINANCIAL HIGHLIGHTS</HEADER>
                <EXPLANATION>
        Marketing expenses (cash) during the
quarter were
            $38.6 million, down from $43 million in
the prior quarter. Since
XYZ
            capitalizes its marketing expenses, the
income statement expense
for
    marketing reflects a net addition of expenses of $6.3
million for a total
    expense of $45 million. On a related note XYZ's
operational cash flow was
    $27.7 million, the third such quarter with positive cash
flow.
All other
            expense areas were in line with our
expectations except for gross margins
    where results were 350 basis points above expectations
due partly to lower
    data line costs and royalty fees. Management also
indicated that capital
    expenditures for fiscal 1998 would be approximately $90
million,
down from
an earlier estimate of $100 million.
                    </EXPLANATION>
                </POINT>
                <POINT>
                <HEADER>CSi HIGHLIGHTS</HEADER>
                <EXPLANATION>
        Management has scheduled two near-term
initiatives along
                with the flat-fee pricing model to
invigorate subscriber growth.
First,
                starting this quarter XYZ will begin a
renewed targeted
advertising
                campaign focused on vertical market
segments to supplement CSi's existing
                subscriber base. Second, management
reiterated its plan to launch
CSi 97,
                a Web interface for the CSi service, by
December 1. In the last
two
                months, CSi's monthly subscriber
attrition rate has declined to
```

```
                                    -continued the lowest
                    level in the last 16 months.
                    </EXPLANATION>
                </POINT>
                <POINT>
                    <HEADER>STRATEGIC PLAN</HEADER>
                    <EXPLANATION>
                    H&R Block (HRB) management indicated
that they continue to
                    be in talks regarding business
combinations with third parties.
In case,
                    an agreement is not reached, HRB will
continue with its plan to spin-off
                    its 80.1% stake in XYZ.
                    </EXPLANATION>
                </POINT>
                <POINT>
                    <HEADER>VALUATION</HEADER>
                    <EXPLANATION>
                    At yesterday's close ($11 15/16), XYZ
is trading at a price-to
                    revenue multiple for calendar 1997 of
1.3. In the quarter
reported, XYZ's
                    tangible book value was $6.50, with
approximately $1.44 in cash
and
                    equivalents, and $1.82 including
short-term investments
representing a $7
                    million increase in cash during the
quarter. In September, XYZ
will
                    receive $70 million from HRB in
payment for the NOL (non-operating
loss)
                    tax benefit received by HRB in
calendar 1996. Presently the
payment sum
                    appears in the category of 'other
assets' on the XYZ balance
sheet. The
                    payment will add $0.76 per share to
XYZ1s Q2 (Oct.) 1998 cash
position.
                    We continue to view XYZ shares as a
long-term turnaround
investment
                    opportunity given its core assets.
                    </EXPLANATION>
                </POINT>
            </DETAILS>
        </USC-STOCK-NOTE>
</FINCORP.MORNING>
```

What is claimed is:

1. A system for storing and retrieving at least one document for display, the at least one document having a content containing a plurality of text items arranged in accordance with at least a portion of a plurality of mark-up elements of a mark-up language relating to the content of the at least one document, comprising:

a document storage device for storing the at least one document;

at least one contributor workstation in communication with the document storage device, each contributor workstation including a document generating module for formatting the at least one document in accordance with the mark-up language prior to storage at the document storage device;

a search engine, in communication with the document storage device, for retrieving the at least one document by performing a search through the plurality of text items on the basis of at least associated mark-up elements in the content of the at least one document; and at least one user computer in communication with the document storage device, wherein the at least one user computer includes a processing module for processing the retrieved at least one document in accordance with the mark-up language.

2. The system according to claim 1, wherein the document storage device includes:

an index server; and a database in communication with the index server.

3. The system according to claim 1, wherein the mark-up language is a document type definition created in accordance with a meta-language, wherein the document type definition includes the plurality of mark-up elements, and wherein the text data items of the at least one document are organized in accordance with at least a portion of the mark-up elements of the document type definition.

4. The system according to claim 3, wherein the meta-language is XML.

5. The system according to claim 3, wherein:
the meta-language is SGML.

6. The system according to claim 4, wherein the document generating module is an XML generator module.

7. The system according to claim 4, wherein the processing module is an XML processing module.

8. In a system for storing and retrieving at least one of at least one text document containing a content having a plurality of text items arranged in accordance with at least one mark-up element of a mark-up language, a method for searching through the text items of the at least one document, comprising:

accepting a search query comprising at least one sub-query, each sub-query including at least one search condition;

determining whether each sub-query is one of unrestricted or restricted by determining whether each sub-query includes a search field, each search field identifying one of the at least one mark-up element;

determining, if the sub-query is restricted, whether the search condition of the restricted sub-query is satisfied by the text item associated with the mark-up element identified by the search field of the restricted sub-query;

determining, if the sub-query is unrestricted, whether the search condition is satisfied by any text item of the test document; and retrieving each text document satisfying the search condition of the at least one sub-query.

9. The method according to claim 8, wherein each search field of the restricted search query is selected from a plurality of possible search fields identifying a corresponding plurality of mark-up elements.

10. An apparatus for searching and retrieving at least one stored document containing a content having a plurality of text items arranged in accordance with at least one mark-up element of a mark-up language, comprising:

means for accepting a search query comprising at least one sub-query, each sub-query including at least one search condition;

first means for determining whether each sub-query is one of unrestricted or restricted by determining whether each sub-query includes a search field, each search field identifying one of the at least one mark-up element;

second means for determining, if the sub-query is restricted, whether the search condition of the restricted sub-query is satisfied by the text item associated with the mark-up element identified by the search field of the restricted sub-query;

third means for determining, if the sub-query is unrestricted, whether the search condition is satisfied by any text item of the text document; and means for retrieving each text document satisfying the search condition of the at least one sub-query.

11. The apparatus according to claim 10, wherein each search field of the restricted search query is selected from a plurality of possible search fields identifying a corresponding plurality of mark-up elements.

\* \* \* \* \*